United States Patent
Raja et al.

(10) Patent No.: US 11,709,765 B1
(45) Date of Patent: Jul. 25, 2023

(54) INTELLIGENT TEST CASES GENERATION BASED ON VOICE CONVERSATION

(71) Applicant: Bank of America Corporation, Charlotte, NC (US)

(72) Inventors: Kiran Sudhir Raja, Maharashtra (IN); Udaya Kumar Raju Ratnakaram, Telangana (IN); Arnold Teen Absalom, Tamil Nadu (IN); Bibhu Ranjan Sahoo, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/567,944

(22) Filed: Jan. 4, 2022

(51) Int. Cl.
*G06F 11/36* (2006.01)
*G06F 8/77* (2018.01)
*G10L 17/14* (2013.01)
*G10L 17/22* (2013.01)

(52) U.S. Cl.
CPC .......... *G06F 11/3684* (2013.01); *G06F 8/77* (2013.01); *G10L 17/14* (2013.01); *G10L 17/22* (2013.01)

(58) Field of Classification Search
None
See application file for complete search history.

(56) References Cited

U.S. PATENT DOCUMENTS

| | | | |
|---|---|---|---|
| 9,772,933 B1 * | 9/2017 | Edrey | G06F 11/3692 |
| 2003/0163323 A1 | 8/2003 | Bluvband | |
| 2006/0010428 A1 | 1/2006 | Rushby et al. | |
| 2006/0101331 A1 | 5/2006 | Wang et al. | |
| 2007/0263834 A1 | 11/2007 | Jensen et al. | |
| 2008/0141084 A1 | 6/2008 | Bohizic et al. | |
| 2012/0226465 A1 | 9/2012 | Mizuno et al. | |
| 2016/0098270 A1 | 4/2016 | Hanusiak et al. | |
| 2016/0162392 A1 * | 6/2016 | Hu | G06F 11/3688 714/38.1 |
| 2016/0170972 A1 | 6/2016 | Andrejko et al. | |
| 2016/0275942 A1 * | 9/2016 | Drewes | G06F 40/242 |
| 2016/0364210 A1 | 12/2016 | Davidov et al. | |
| 2016/0378647 A1 * | 12/2016 | Maeoka | G06F 11/3688 717/124 |

(Continued)

OTHER PUBLICATIONS

Melo, G., Law, E., Alencar, P. and Cowan, D., "Exploring Context-Aware Conversational Agents in Software Development," arXiv: 2006.02370v1, Jun. 3, 2020. (Year: 2020).*

*Primary Examiner* — Andrew M. Lyons
(74) *Attorney, Agent, or Firm* — Banner & Witcoff, Ltd.

(57) ABSTRACT

Aspects of the disclosure relate to generating test cases based on voice conversation. In some embodiments, a computing platform may receive voice data associated with an agile development meeting. Subsequently, the computing platform may identify, using a natural language processing engine, context of one or more requirements being discussed during the agile development meeting. Based on identifying the context of the one or more requirements being discussed during the agile development meeting, the computing platform may store context data into a database. Next, the computing platform may map the context data to a corresponding task item of a software development project. Thereafter, the computing platform may identify one or more test cases to be generated. Then, the computing platform may cause the identified test cases to be executed.

18 Claims, 8 Drawing Sheets

(56) References Cited

U.S. PATENT DOCUMENTS

| | | |
|---|---|---|
| 2017/0024311 A1 | 1/2017 | Andrejko et al. |
| 2017/0177455 A1 | 6/2017 | Dusanapudi et al. |
| 2017/0177765 A1 | 6/2017 | Dusanapudi et al. |
| 2018/0046570 A1* | 2/2018 | Kaulgud ............. G06F 11/3684 |
| 2018/0107588 A1 | 4/2018 | Singi et al. |
| 2018/0239603 A1 | 8/2018 | Balestrazzi et al. |
| 2018/0275988 A1 | 9/2018 | Shmaya et al. |
| 2018/0341645 A1* | 11/2018 | LeBlanc ................ G06F 40/237 |
| 2019/0087312 A1* | 3/2019 | Akbulut .............. G06F 11/3684 |
| 2019/0179732 A1 | 6/2019 | Venkatasubramanian et al. |
| 2019/0196950 A1 | 6/2019 | Ranganathan et al. |
| 2019/0243751 A1 | 8/2019 | Ganda et al. |
| 2019/0266076 A1 | 8/2019 | Maliani et al. |
| 2019/0377736 A1* | 12/2019 | Balasubramanian ........................ G06F 11/3692 |
| 2020/0065228 A1 | 2/2020 | Liu et al. |
| 2020/0097388 A1 | 3/2020 | Bhat et al. |
| 2020/0135041 A1 | 4/2020 | Arslan et al. |
| 2020/0158780 A1 | 5/2020 | Ranganathan et al. |
| 2020/0226324 A1 | 7/2020 | Mattera et al. |
| 2020/0242005 A1 | 7/2020 | Liu et al. |
| 2021/0157576 A1* | 5/2021 | Sinha ...................... G06F 40/30 |
| 2021/0279577 A1* | 9/2021 | West ................... G06N 3/0445 |

* cited by examiner

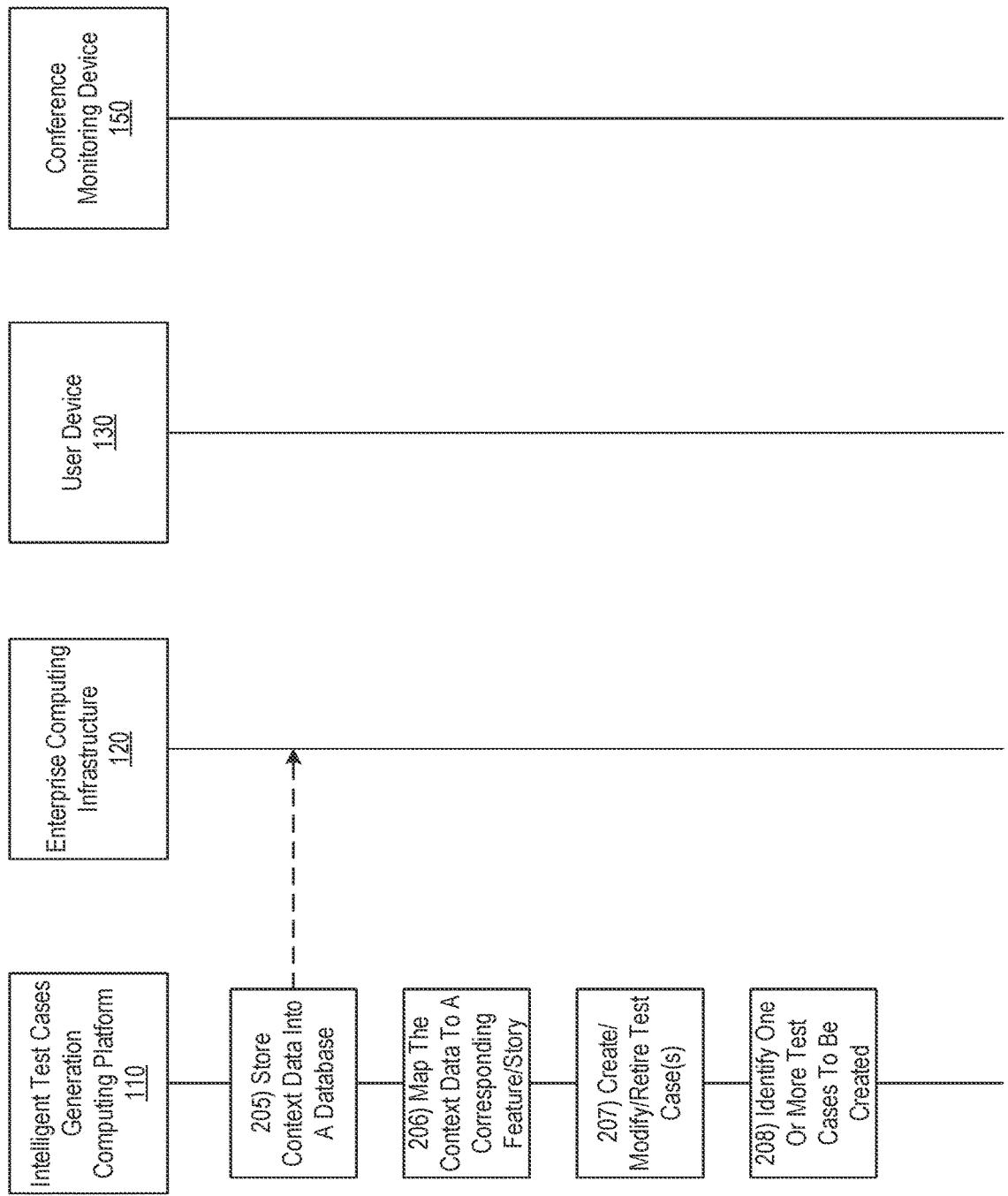

US 11,709,765 B1

INTELLIGENT TEST CASES GENERATION BASED ON VOICE CONVERSATION

BACKGROUND

Aspects of the disclosure generally relate to one or more computer systems, servers, and/or other devices including hardware and/or software. In particular, one or more aspects of the disclosure relate to an intelligent generation of test cases based on voice conversation.

In agile software development, requirements and solutions often evolve through collaboration between interdependent teams. Agile meetings or agile ceremonies, where team members collaborate and hold discussions, are a staple in agile development projects. In many instances, the responsibility of converting the conversations from an agile development meeting into test scenarios lies with an individual, such as a tester or developer. With cross-functional teams, it may be difficult to gather a holistic view of requirements and scenarios, which may lead to defects escaping to production. In many instances, since the agile development process is voice-based and happens through meetings, rather than through documentation, for example, it may be difficult to intelligently and automatically generate test cases for a software development project.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with generating test cases based on voice conversation. In accordance with one or more embodiments, a computing platform having at least one processor, a communication interface, and memory may receive, via the communication interface, voice data associated with an agile development meeting. Subsequently, the computing platform may identify, using a natural language processing engine, context of one or more requirements being discussed during the agile development meeting. Based on identifying the context of the one or more requirements being discussed during the agile development meeting, the computing platform may store context data into a database. Next, the computing platform may map the context data to a corresponding task item of a software development project. Thereafter, the computing platform may identify one or more test cases to be generated. Then, the computing platform may cause the identified test cases to be executed.

In some embodiments, mapping the context data to the corresponding task item of the software development project may include mapping the context data to one or more of: a software feature or a user story.

In some embodiments, the computing platform may monitor performance of the identified test cases, and based on monitoring the performance of the identified test cases, optimize system performance using an artificial-intelligence engine.

In some embodiments, the computing platform may identify, via a voice recognition engine, a plurality of participants of the agile development meeting; associate each of the one or more requirements being discussed during the agile development meeting with one of the plurality of participants; and based on associating each of the one or more requirements being discussed during the agile development meeting with one of the plurality of participants, prioritize a particular test case in relation to other test cases.

In some embodiments, receiving the voice data associated with the agile development meeting may include capturing the voice data from a user device.

In some embodiments, receiving the voice data associated with the agile development meeting may include capturing the voice data from a conference monitoring device.

In some embodiments, based on mapping the context data the corresponding task item of the software development project, the computing platform may generate a new test case.

In some embodiments, based on mapping the context data the corresponding task item of the software development project, the computing platform may retire an existing test case.

In some embodiments, based on mapping the context data the corresponding task item of the software development project, the computing platform may modify an existing test case.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for generating test cases based on voice conversation in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to intelligent generation of test cases based on voice conversation. In particular, one or more aspects of the disclosure may listen to and/or record agile refinement/grooming calls and use natural language processing to distill/capture software testing requirements from the voice data. Additional aspects of the disclosure may identify the changes to existing test cases and propose new test cases. Further aspects of the disclosure may prioritize certain test cases over others using profile based decisioning. Further aspects of the disclosure may monitor performance of automated identification of requirements and test cases and apply a machine learning process to optimize system performance based on monitored data.

Figure 1A:
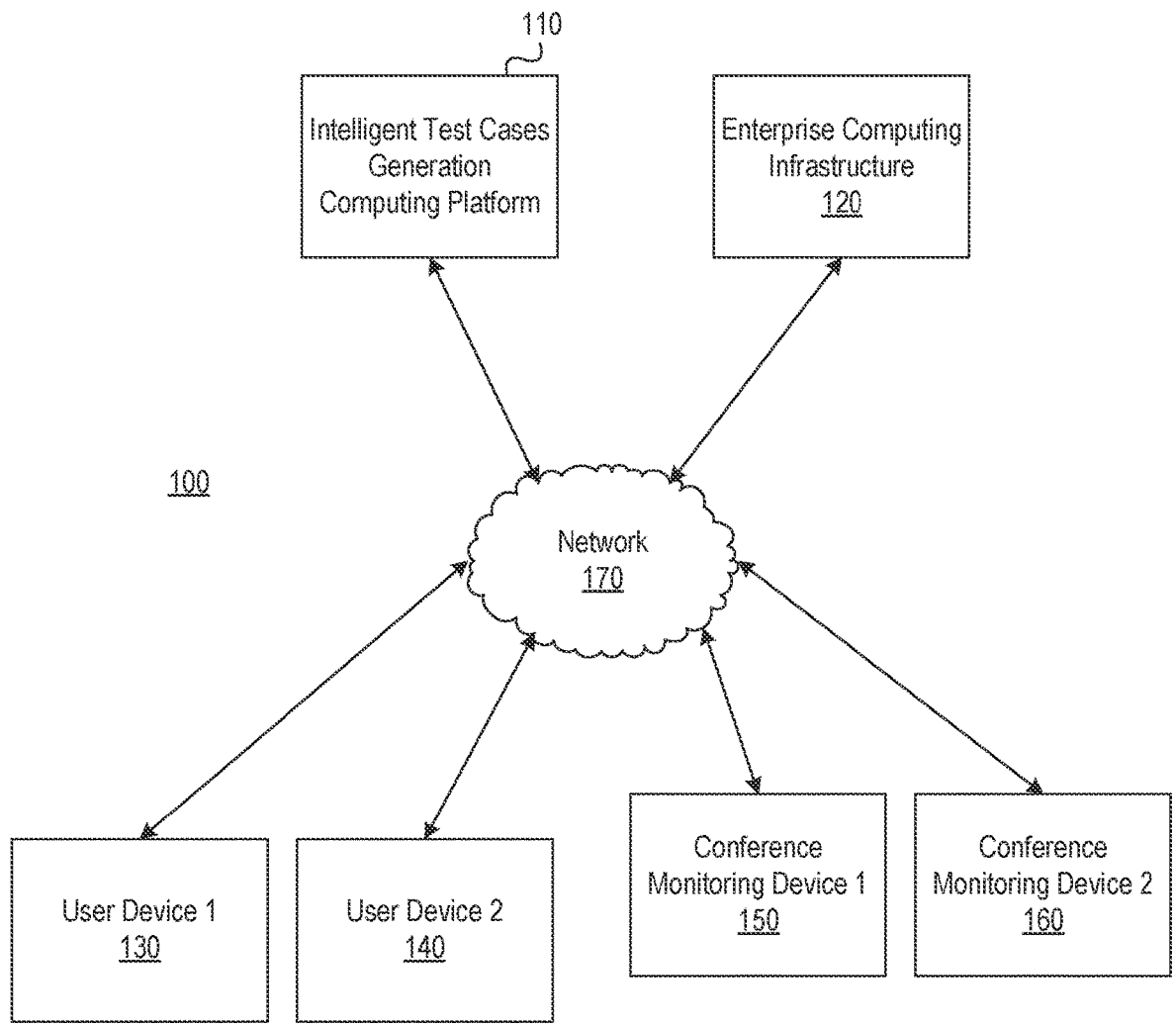
FIGS. 1A and 1B depict an illustrative computing environment for generating test cases based on voice conversation in accordance with one or more example embodiments.
Figure 1B:
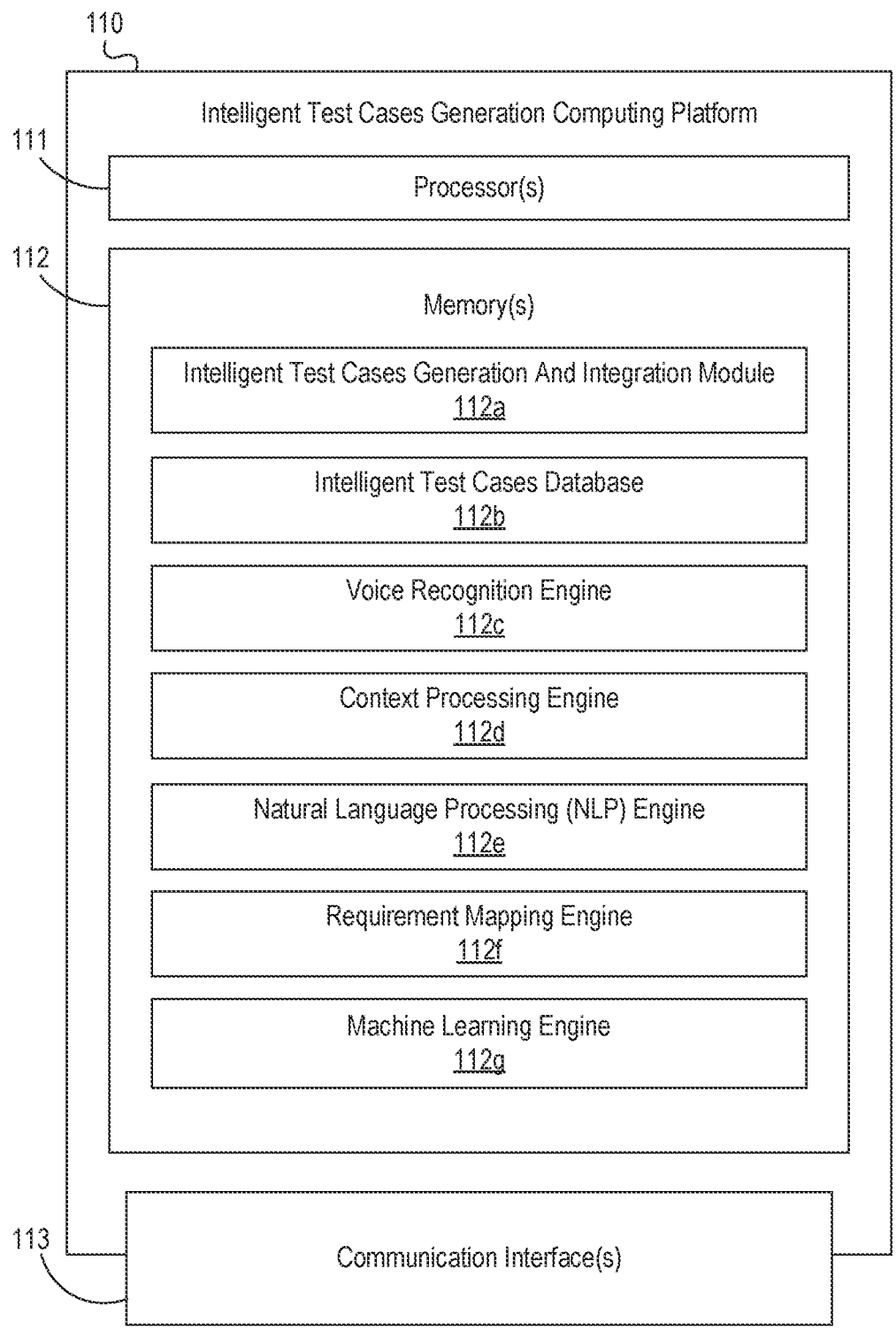

FIGS. 1A and 1B depict an illustrative computing environment for generating test cases based on voice conversation in accordance with one or more example arrangements. Referring to FIG. 1A, computing environment 100 may include one or more devices (e.g., computer systems, communication devices, servers). For example, computing environment 100 may include an intelligent test cases generation computing platform 110, enterprise computing infrastructure 120, a first user device 130, a second user device 140, a first conference monitoring device 150, and a second conference monitoring device 160. Although two user devices 130, 140 are shown for illustrative purposes, any number of user devices may be used without departing from the disclosure. Although two conference monitoring devices 140, 150 are shown for illustrative purposes, any number of conference monitoring devices may be used without departing from the disclosure.

As illustrated in greater detail below, intelligent test cases generation computing platform 110 may include one or more computing devices configured to perform one or more of the functions described herein. For example, intelligent test cases generation computing platform 110 may include one or more computers (e.g., laptop computers, desktop computers, servers, server blades, or the like).

Enterprise computing infrastructure 120 may include backend servers and systems. For example, enterprise computing infrastructure 120 may include one or more computers or other computing devices such as one or more server systems, one or more processing devices such as a server, and one or more memory devices as well as one or more communication devices. For instance, enterprise computing infrastructure 120 may be configured to host a testing environment and one or more databases storing various testing templates and requirement documents, and may be associated with intelligent test cases generation computing platform 110.

User device 130, 140 may be a personal computing device (e.g., desktop computer, laptop computer), mobile computing device (e.g., smartphone, tablet), or voice-enabled IoT (Internet of Things) device that may be linked to and/or used by an enterprise user (who may, e.g., be an employee or affiliate of an enterprise organization, such as a financial institution). Additionally or alternatively, user device 130, 140 may be deployed at a specific enterprise center, such as a specific banking center operated by a financial institution. In some examples, user device 130, 140 may be linked to different developers.

Conference monitoring device 150, 160 may be a device located in a conference room configured to monitor and/or capture conversations during a conference or meeting (e.g., developer conversations). Additionally or alternatively, conference monitoring device 150, 160 may be and/or include an automated tool plugged into a web conferencing meeting configured to monitor and/or capture conversations in a conference call environment.

Computing environment 100 also may include one or more networks, which may interconnect one or more of intelligent test cases generation computing platform 110, enterprise computing infrastructure 120, user device 130, user device 140, conference monitoring device 150, and conference monitoring device 160. For example, computing environment 100 may include network 170. Network 170 may include one or more sub-networks (e.g., local area networks (LANs), wide area networks (WANs), or the like). For example, network 170 may include a private sub-network that may be associated with a particular organization (e.g., a corporation, financial institution, educational institution, governmental institution, or the like) and that may interconnect one or more computing devices associated with the organization. For example, intelligent test cases generation computing platform 110, enterprise computing infrastructure 120, user device 130, and user device 140 may be associated with an organization (e.g., a financial institution), and network 170 may be associated with and/or operated by the organization, and may include one or more networks (e.g., LANs, WANs, virtual private networks (VPNs), or the like) that interconnect intelligent test cases generation computing platform 110, enterprise computing infrastructure 120, user device 130, and user device 140. Network 170 also may include a public sub-network that may connect the private sub-network and/or one or more computing devices connected thereto (e.g., intelligent test cases generation computing platform 110, enterprise computing infrastructure 120, user device 130, and user device 140) with one or more networks and/or computing devices that are not associated with the organization (e.g., conference monitoring device 150, conference monitoring device 160).

In one or more arrangements, intelligent test cases generation computing platform 110, enterprise computing infrastructure 120, user device 130, user device 140, conference monitoring device 150, and conference monitoring device 160 may be any type of computing device capable of receiving a user interface, receiving input via the user interface, and communicating the received input to one or more other computing devices. For example, intelligent test cases generation computing platform 110, enterprise computing infrastructure 120, user device 130, user device 140, conference monitoring device 150, conference monitoring device 160, and/or the other systems included in computing environment 100 may, in some instances, include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions.

Referring to FIG. 1B, intelligent test cases generation computing platform 110 may include one or more processors 111, memory 112, and communication interface 113. A data bus may interconnect processor 111, memory 112, and communication interface 113. Communication interface 113 may be a network interface configured to support communication between intelligent test cases generation computing platform 110 and one or more networks (e.g., network 170, or the like). Memory 112 may include one or more program modules having instructions that when executed by processor 111 cause intelligent test cases generation computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of intelligent test cases generation computing platform 110 and/or by different computing devices that may form and/or otherwise make up intelligent test cases generation computing platform 110. For example, memory 112 may have, host, store, and/or include intelligent test cases generation and integration module 112a, intelligent test cases database 112b, voice recognition engine 112c, context processing engine 112d, natural language processing (NLP) engine 112e, requirement mapping engine 112f, and machine learning engine 112g.

Intelligent test cases generation and integration module 112a may have instructions that direct and/or cause intelligent test cases generation and integration module 112a to intelligently generate test cases based on voice conversation and/or perform other functions, as discussed in greater detail below. Intelligent test cases database 112b may store information used by intelligent test cases generation and integration module 112a and/or intelligent test cases generation computing platform 110 in intelligently generating test cases based on voice conversation. Voice recognition engine 112c may have instructions that direct and/or cause intelligent test cases generation computing platform 110 to identify different parties in a conversation and create a context map for each party along with each feature/story involved in the discussion of a specific software testing requirement, and/or perform other functions. Context processing engine 112d may have instructions that direct and/or cause intelligent test cases generation computing platform 110 to identify requirements that match up with certain test cases, and/or perform other functions, as discussed in greater detail below. Natural language processing (NLP) engine 112e may have instructions that direct and/or cause intelligent test cases generation computing platform 110 to use deep learning techniques (e.g., Long Short-Term Memory (LSTM)) to filter data (e.g., determine relevant data to store in a database and discard irrelevant data). In addition, natural language processing (NLP) engine 112e may map a topic currently being discussed to specific requirements, which intelligent test cases generation computing platform 110 may identify and add to a set of requirements. In addition, natural language processing (NLP) engine 112e may use a context processing algorithm (e.g., via context processing engine 112d) to identify different requirements, and/or perform other functions, as discussed in greater detail below. Requirement mapping engine 112f may have instructions that direct and/or cause intelligent test cases generation computing platform 110 to process the data stored in the database (e.g., by the natural language processing (NLP) engine 112e) and processes information related to each feature/story. Machine learning engine 112g may have instructions that direct and/or cause intelligent test cases generation computing platform 110 to set, define, and/or iteratively redefine rules, techniques and/or other parameters used by intelligent test cases generation computing platform 110 and/or other systems in computing environment 100 in generating test cases based on voice conversation.

Figure 2A:
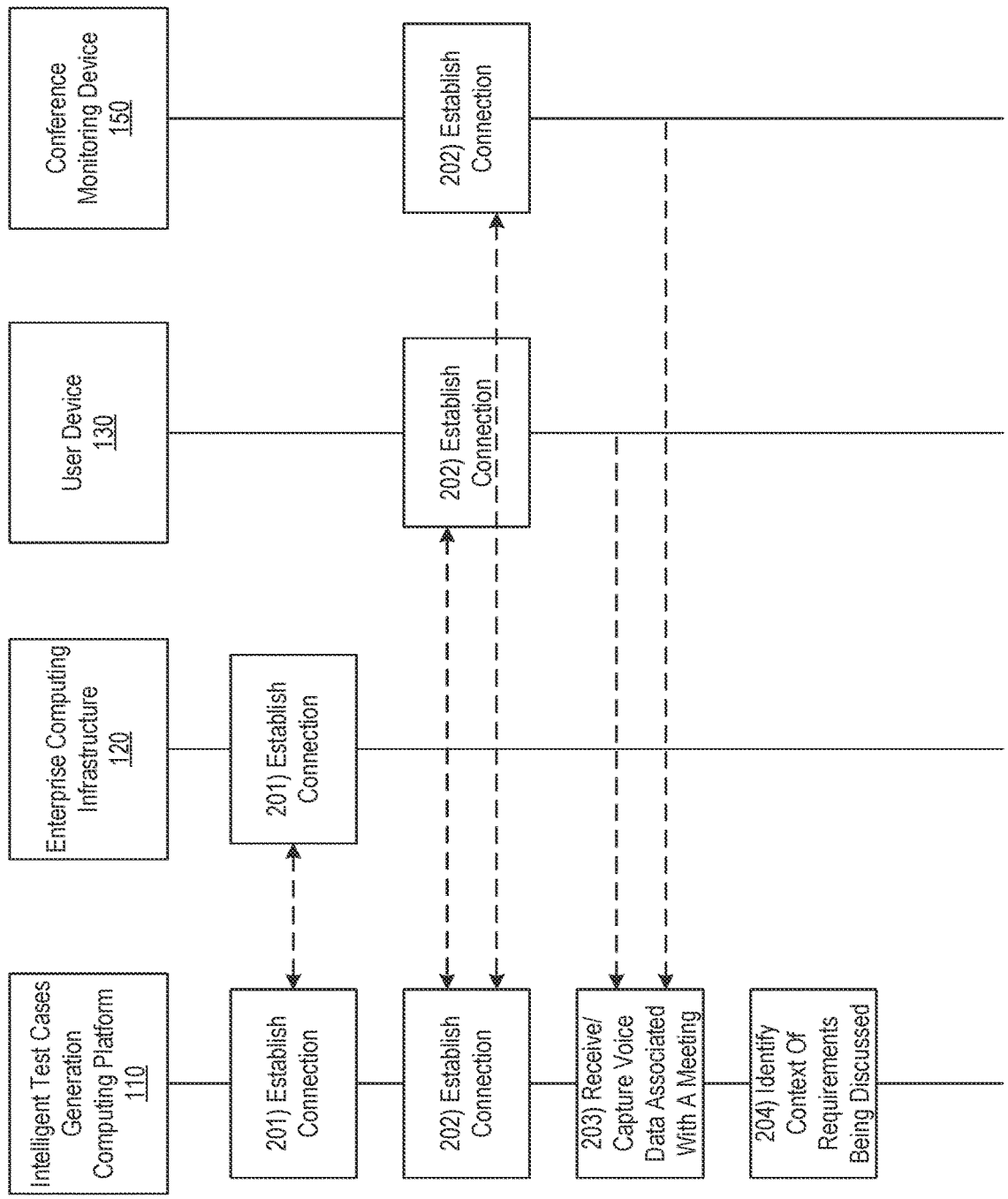

FIGS. 2A-2D depict an illustrative event sequence for generating test cases based on voice conversation in accordance with one or more example embodiments. Referring to FIG. 2A, at step 201, intelligent test cases generation computing platform 110 may establish a connection with enterprise server infrastructure 120. For example, intelligent test cases generation computing platform 110 may establish a first wireless data connection with enterprise server infrastructure 120 to link intelligent test cases generation computing platform 110 with enterprise server infrastructure 120. In some instances, intelligent test cases generation computing platform 110 may identify whether or not a connection is already established with the enterprise server infrastructure 120. If a connection is already established with enterprise server infrastructure 120, intelligent test cases generation computing platform 110 might not re-establish the connection. If a connection is not yet established with enterprise server infrastructure 120, intelligent test cases generation computing platform 110 may establish the first wireless data connection as described above.

At step 202, intelligent test cases generation computing platform 110 may establish a connection with user device 130 and/or conference monitoring device 150. For example, intelligent test cases generation computing platform 110 may establish a second wireless data connection with user device 130 to link intelligent test cases generation computing platform 110 with user device 130. In some instances, intelligent test cases generation computing platform 110 may identify whether or not a connection is already established with user device 130. If a connection is already established with user device 130, intelligent test cases generation computing platform 110 might not re-establish the connection. If a connection is not yet established with the user device 130, intelligent test cases generation computing platform 110 may establish the second wireless data connection as described above. Additionally or alternatively, for example, intelligent test cases generation computing platform 110 may establish a third wireless data connection with conference monitoring device 150 to link intelligent test cases generation computing platform 110 with conference monitoring device 150. In some instances, intelligent test cases generation computing platform 110 may identify whether or not a connection is already established with conference monitoring device 150. If a connection is already established with conference monitoring device 150, intelligent test cases generation computing platform 110 might not re-establish the connection. If a connection is not yet established with the conference monitoring device 150, intelligent test cases generation computing platform 110 may establish the third wireless data connection as described above.

At step 203, intelligent test cases generation computing platform 110 may receive (e.g., capture), via the communication interface (e.g., communication interface 113) and while the second and/or third wireless data connection is established, voice data (e.g., developer conversations) associated with an agile development meeting. For example, intelligent test cases generation computing platform 110 may use a natural language processing (NLP) engine (e.g., natural language processing (NLP) engine 112e) in listening and/or recording conversation in an agile development meeting. In some examples, intelligent test cases generation computing platform 110 may capture the voice data from a user device (e.g., user device 130). Additionally or alternatively, intelligent test cases generation computing platform 110 may capture the voice data from a conference monitoring device (e.g., conference monitoring device 150).

At step 204, intelligent test cases generation computing platform 110 may identify, using a natural language processing engine (e.g., natural language processing engine 112e) and/or other program module (e.g., in memory 112), context of one or more requirements (e.g., software testing requirements) being discussed during the agile development meeting.

Referring to FIG. 2B, at step 205, based on identifying the context of the one or more requirements being discussed during the agile development meeting, intelligent test cases generation computing platform 110 may, while the first wireless data connection is established, store context data into a database (e.g., in enterprise computing infrastructure 120 or other data store).

At step 206, intelligent test cases generation computing platform 110 may (e.g., via requirement mapping engine 112f) map the context data to a corresponding task item of a software development project. In some examples, the task item may include a software feature or a user story (e.g., description of a software feature from a user's perspective).

Figure 3:
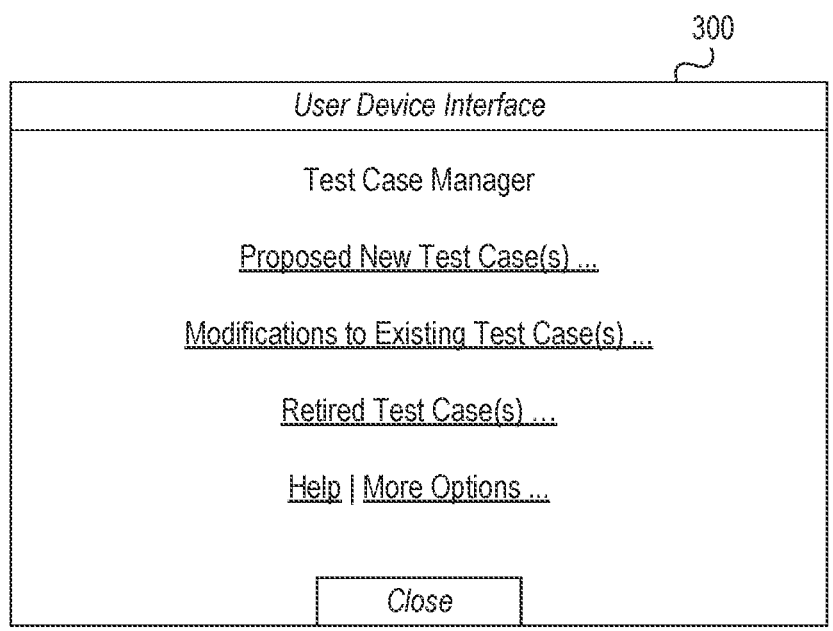
FIG. 3 depicts an example graphical user interfaces for generating test cases based on voice conversation in accordance with one or more example embodiments.

At step 207, based on mapping the context data the corresponding task item of the software development project, intelligent test cases generation computing platform 110 may generate a new test case, adapt/modify an existing test case, and/or retire an existing test case. In some examples, a context processing algorithm (e.g., via context processing engine 112d) and/or other program module (e.g., in memory 112) may be used to identify requirements that match up with certain test cases. In some examples, intelligent test cases generation computing platform 110 may cause a computing device (e.g., user device 130, conference monitoring device 150) to display and/or otherwise present a graphical user interface similar to graphical user interface 300, which is illustrated in FIG. 3. As seen in FIG. 3, graphical user interface 300 may include text and/or other information associated with the automated identification of requirements and test cases and/or management of test cases (e.g., □[Proposed New Test Case(s)□] [Modifications to Existing Test Case(s)□] [Retired Test Cases□] [Help|More Options . . . ]□).

Figure 2C:
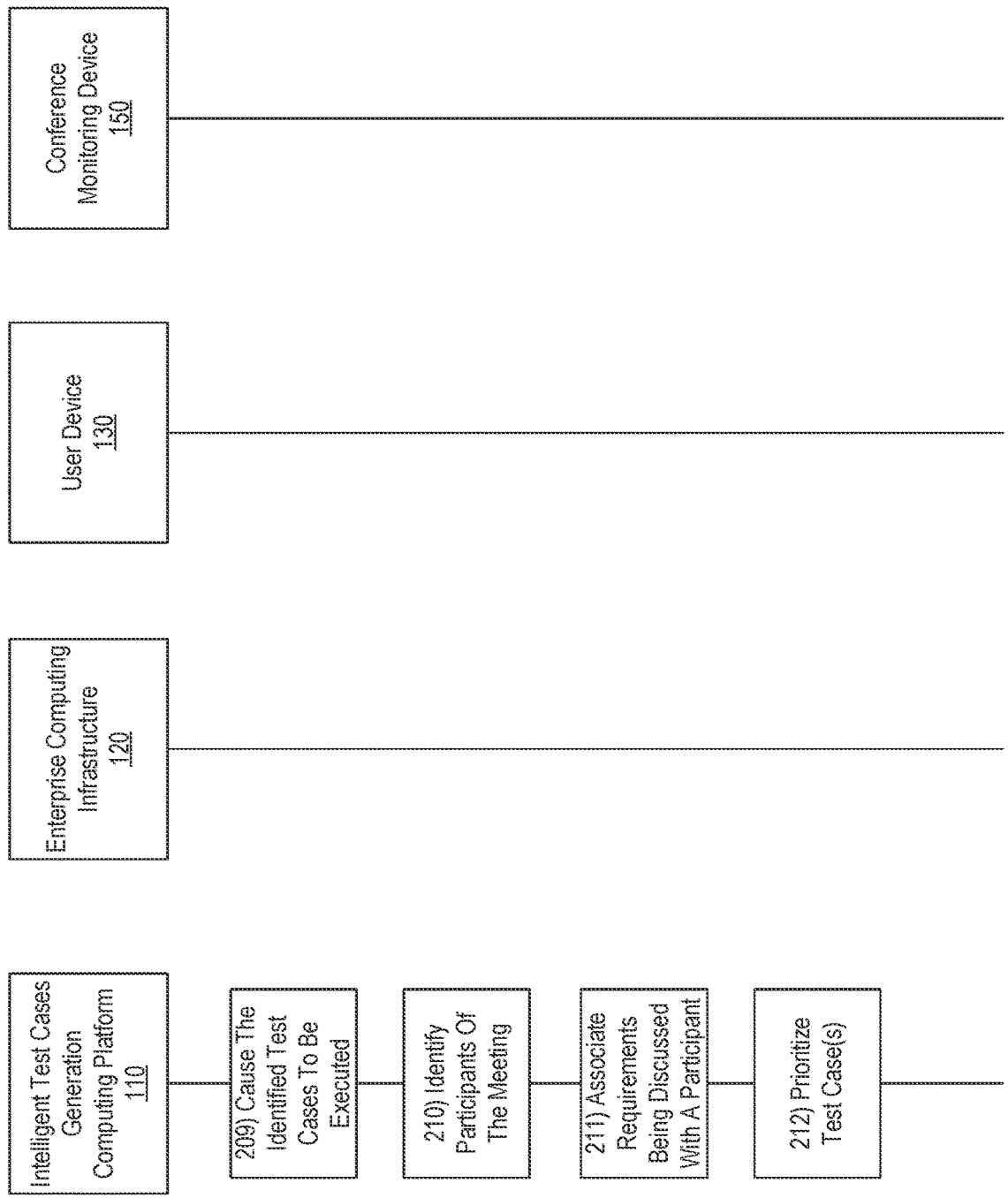

Returning again to FIG. 2B, at step 208, intelligent test cases generation computing platform 110 may (e.g., via intelligent test cases generation and integration module 112a) identify one or more test cases to be generated. Referring to FIG. 2C, at step 209, intelligent test cases generation computing platform 110 may cause the identified test cases to be executed (e.g., using an appropriate testing tool corresponding to the identified test cases).

In some embodiments, intelligent test cases generation computing platform may implement profile based decisioning in selecting test cases. For example, at step 210, intelligent test cases generation computing platform 110 may identify, via a voice recognition engine (e.g., voice recognition engine 112c), a plurality of participants of the agile development meeting. At step 211, intelligent test cases generation computing platform 110 may associate each of the one or more requirements being discussed during the agile development meeting with one of the plurality of participants. At step 212, based on associating each of the one or more requirements being discussed during the agile development meeting with one of the plurality of participants, intelligent test cases generation computing platform 110 may prioritize a particular test case in relation to other test cases. For instance, intelligent test cases generation computing platform 110 might prioritize a product owner or a product manager's test case higher than a staff developer's test case.

Figure 2D:
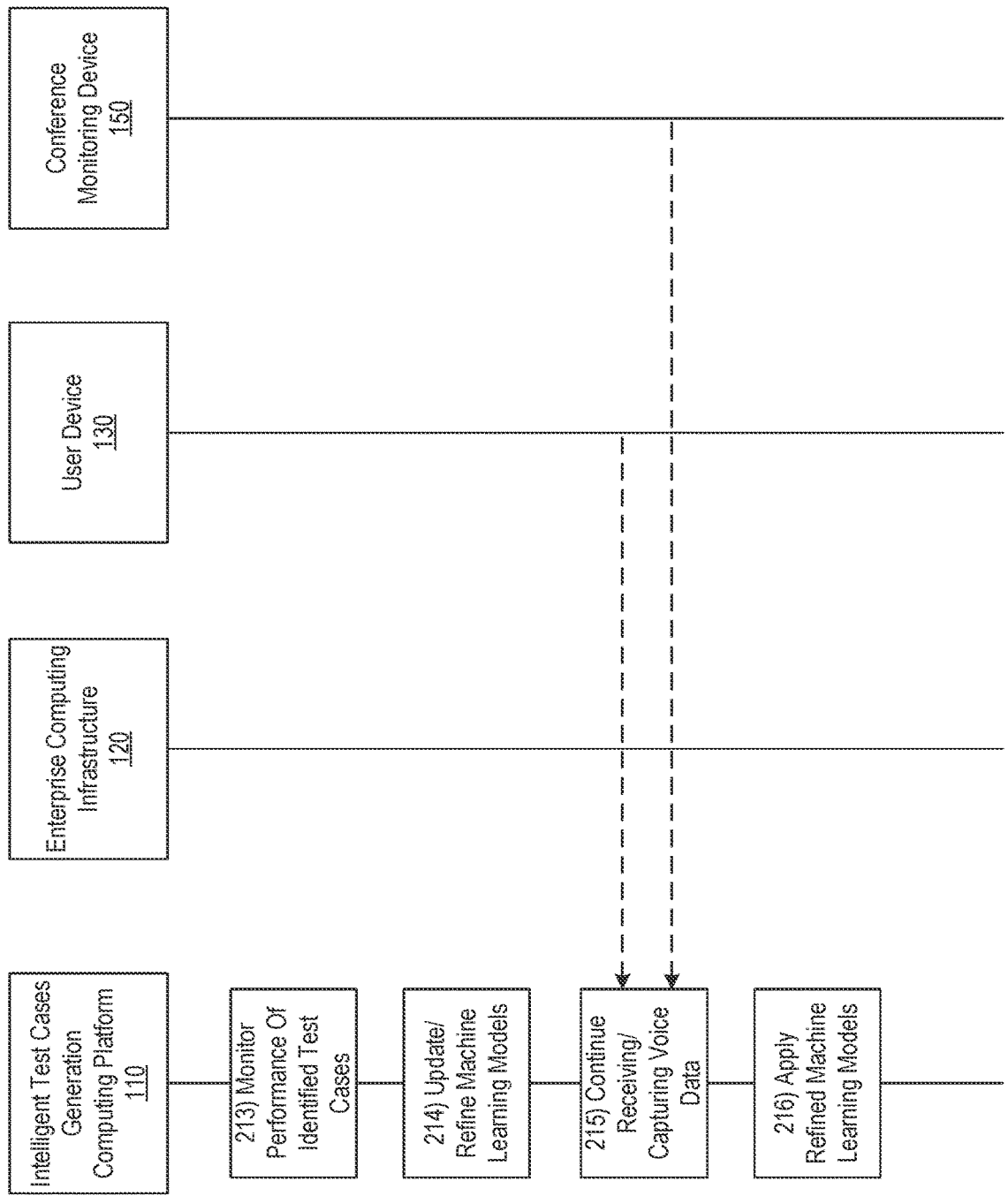

Referring to FIG. 2D, at in some embodiments, at step 213, intelligent test cases generation computing platform 110 may monitor performance of the identified test cases. At step 214, based on monitoring the performance of the identified test cases, intelligent test cases generation computing platform 110 may learn and optimize system performance using an artificial-intelligence engine (e.g., machine learning engine 112g). For example, intelligent test cases generation computing platform 110 may update or refine a machine learning model used to identify test cases.

At step 215, intelligent test cases generation computing platform 110 may continue receiving (e.g., capturing), via the communication interface (e.g., communication interface 113) and while the second and/or third wireless data connection is established, voice data associated with an agile development meeting. For example, intelligent test cases generation computing platform 110 may continue to capture the voice data from user devices (e.g., user device 130) and/or conference monitoring devices (e.g., conference monitoring device 150) and, at step 216, apply the refined machine learning models in generating test cases based on voice conversation.

Figure 4:
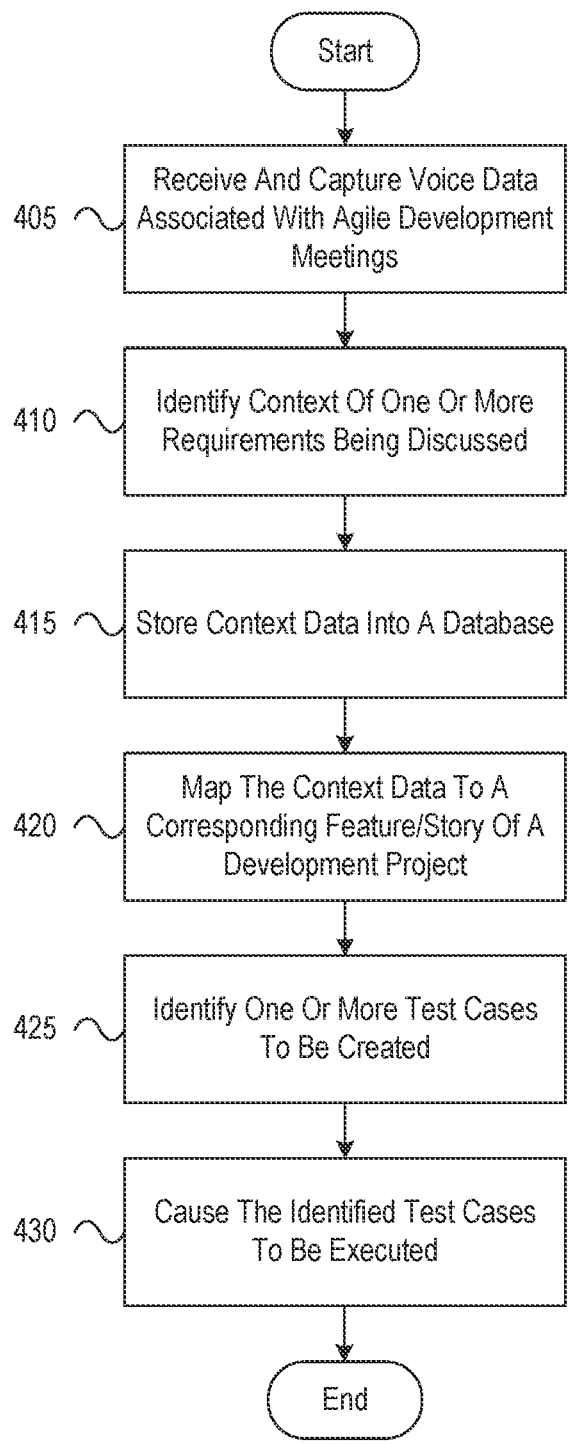
FIG. 4 depicts an illustrative method for generating test cases based on voice conversation in accordance with one or more example embodiments.

FIG. 4 depicts an illustrative method for generating test cases based on voice conversation in accordance with one or more example embodiments. Referring to FIG. 4, at step 405, a computing platform having at least one processor, a communication interface, and memory may receive, via the communication interface, voice data associated with an agile development meeting. At step 410, the computing platform may identify, using a natural language processing engine, context of one or more requirements being discussed during the agile development meeting. At step 415, based on identifying the context of the one or more requirements being discussed during the agile development meeting, the computing platform may store context data into a database. At step 420, the computing platform may map the context data to a corresponding task item of a software development project. At step 425, the computing platform may identify one or more test cases to be generated. At step 430, the computing platform may cause the identified test cases to be executed.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   capture, via the communication interface, voice data associated with a plurality of participants of an agile development meeting, the voice data including one or more requirements being discussed during the agile development meeting;
   based on the captured voice data, identify, using a natural language processing engine, context data associated with the voice data;
   store the identified context data into a database;
   map, using a machine learning engine, the context data to a corresponding task item of a software development project;
   based on mapping the context data to the corresponding task item of the software development project, identify, using the machine learning engine, test cases to be generated;
   identify, via a voice recognition engine, a particular participant of the plurality of participants associated with each of the test cases to be generated;
   determine, based on user profile data of the plurality of participants, a prioritization order of the identified test cases, wherein a test case associated with a first participant of the plurality of participants is prioritized in relation to a test case associated with a second participant of the plurality of participants; and
   cause the identified test cases to be executed based on the prioritization order.

2. The computing platform of claim 1, wherein mapping the context data to the corresponding task item of the software development project comprises mapping the context data to one or more of: a software feature or a user story.

3. The computing platform of claim 1, wherein the memory stores additional computer-readable instructions that, when executed by the at least one processor, cause the computing platform to:
   monitor performance of the identified test cases; and
   based on monitoring the performance of the identified test cases, optimize system performance using an artificial-intelligence engine.

4. The computing platform of claim 1, wherein receiving the voice data associated with the agile development meeting comprises capturing the voice data from a user device.

5. The computing platform of claim 1, wherein receiving the voice data associated with the agile development meeting comprises capturing the voice data from a conference monitoring device.

6. The computing platform of claim 1, wherein the memory stores additional computer-readable instructions that, when executed by the at least one processor, cause the computing platform to:
   based on mapping the context data to the corresponding task item of the software development project, generate a new test case.

7. The computing platform of claim 1, wherein the memory stores additional computer-readable instructions that, when executed by the at least one processor, cause the computing platform to:
   based on mapping the context data to the corresponding task item of the software development project, modify an existing test case.

8. The computing platform of claim 1, wherein the memory stores additional computer-readable instructions that, when executed by the at least one processor, cause the computing platform to:
   based on mapping the context data to the corresponding task item of the software development project, retire an existing test case.

9. A method, comprising:
   at a computing platform comprising at least one processor, a communication interface, and a memory:
   capturing, by the at least one processor, via the communication interface, voice data associated with a plurality of participants of an agile development meeting, the voice data including one or more requirements being discussed during the agile development meeting;
   based on the captured voice data, identifying, by the at least one processor, using a natural language processing engine, context data associated with the voice data;
   storing, by the at least one processor, the identified context data into a database;
   mapping, by the at least one processor, using a machine learning engine, the context data to a corresponding task item of a software development project;
   based on mapping the context data to the corresponding task item of the software development project, identifying, by the at least one processor, using the machine learning engine, test cases to be generated;

identifying, by the at least one processor, via a voice recognition engine, a particular participant of the plurality of participants associated with each of the test cases to be generated;

determining, by the at least one processor, based on user profile data of the plurality of participants, a prioritization order of the identified test cases, wherein a test case associated with a first participant of the plurality of participants is prioritized in relation to a test case associated with a second participant of the plurality of participants; and causing, by the at least one processor, the identified test cases to be executed based on the prioritization order.

10. The method of claim 9, wherein mapping the context data to the corresponding task item of the software development project comprises mapping the context data to one or more of: a software feature or a user story.

11. The method of claim 9, further comprising:
monitoring, by the at least one processor, performance of the identified test cases; and
based on monitoring the performance of the identified test cases, optimizing, by the at least one processor, system performance using an artificial-intelligence engine.

12. The method of claim 9, wherein receiving the voice data associated with the agile development meeting comprises capturing the voice data from a user device.

13. The method of claim 9, wherein receiving the voice data associated with the agile development meeting comprises capturing the voice data from a conference monitoring device.

14. The method of claim 9, further comprising:
based on mapping the context data to the corresponding task item of the software development project, generating, by the at least one processor, a new test case.

15. The method of claim 9, further comprising:
based on mapping the context data to the corresponding task item of the software development project, modifying, by the at least one processor, an existing test case.

16. The method of claim 9, further comprising:
based on mapping the context data to the corresponding task item of the software development project, retiring, by the at least one processor, an existing test case.

17. One or more non-transitory computer-readable media storing instructions that, when executed by a computing platform comprising at least one processor, a communication interface, and memory, cause the computing platform to:

capture, via the communication interface, voice data associated with a plurality of participants of an agile development meeting, the voice data including one or more requirements being discussed during the agile development meeting;

based on the captured voice data, identify, using a natural language processing engine, context data associated with the voice data;

store the identified context data into a database;

map, using a machine learning engine, the context data to a corresponding task item of a software development project;

based on mapping the context data to the corresponding task item of the software development project, identify, using the machine learning engine, test cases to be generated;

identify, via a voice recognition engine, a particular participant of the plurality of participants associated with each of the test cases to be generated;

determine, based on user profile data of the plurality of participants, a prioritization order of the identified test cases, wherein a test case associated with a first participant of the plurality of participants is prioritized in relation to a test case associated with a second participant of the plurality of participants; and cause the identified test cases to be executed based on the prioritization order.

18. The one or more non-transitory computer-readable media of claim 17, wherein the instructions, when executed by the computing platform, further cause the computing platform to:
monitor performance of the identified test cases; and
based on monitoring the performance of the identified test cases, optimize system performance using an artificial-intelligence engine.

* * * * *